(12) United States Patent
Dickson, Jr.

(10) Patent No.: US 6,247,346 B1
(45) Date of Patent: Jun. 19, 2001

(54) METHOD OF FORMING A DRIVE SHAFT

(75) Inventor: John A. Dickson, Jr., Newtown Square, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/395,248

(22) Filed: Sep. 13, 1999

Related U.S. Application Data

(60) Continuation-in-part of application No. 08/941,938, filed on Oct. 1, 1997, now Pat. No. 5,951,794, which is a division of application No. 08/769,617, filed on Dec. 18, 1996.

(51) Int. Cl.[7] .................................................. B21K 21/12
(52) U.S. Cl. ........................................ 72/370.13; 464/183
(58) Field of Search ............................ 72/367.1, 370.02, 72/370.1, 370.13, 370.25, FOR 100, 377; 464/183

(56) References Cited

U.S. PATENT DOCUMENTS

| | | |
|---|---|---|
| 1,292,388 | 1/1919 | Bright et al. |
| 1,765,709 | 6/1930 | Withington . |
| 1,798,305 | 3/1931 | Christophersen . |
| 2,133,091 * | 10/1938 | Gettig ................................. 72/377 |
| 3,190,084 | 6/1965 | Moon et al. ............................. 64/3 |
| 3,668,918 * | 6/1972 | Benteler et al. ................. 72/370.13 |
| 4,188,800 | 2/1980 | Fujita et al. ............................ 64/4 |
| 4,298,155 * | 11/1981 | Palovcik ........................... 72/370.13 |
| 4,392,839 * | 7/1983 | Aucktor ............................... 464/183 |
| 4,527,978 * | 7/1985 | Zackrisson ......................... 464/183 |
| 4,552,544 | 11/1985 | Beckman et al. ................... 464/162 |
| 4,875,538 | 10/1989 | Hodgson et al. .................... 180/379 |
| 5,234,378 | 8/1993 | Helgesen et al. ................... 464/180 |
| 5,304,012 | 4/1994 | Wendling ........................... 403/274 |
| 5,346,432 | 9/1994 | Greulich et al. ................... 464/180 |
| 5,378,178 | 1/1995 | Haman ................................. 440/53 |
| 5,516,158 | 5/1996 | Watts ................................. 285/333 |
| 5,538,475 | 7/1996 | Jaskowiak .......................... 464/181 |
| 5,551,918 | 9/1996 | Jones et al. ........................... 464/80 |
| 5,626,050 | 5/1997 | Ploughe et al. ...................... 72/370 |
| 5,637,042 | 6/1997 | Breese ............................... 464/183 |
| 5,643,093 | 7/1997 | Breese ............................... 464/183 |

FOREIGN PATENT DOCUMENTS 2066418   12/1979   (GB) ................................. 260/336

* cited by examiner

*Primary Examiner*—Lowell A. Larson
(74) *Attorney, Agent, or Firm*—David W. Pearce-Smith

(57) ABSTRACT

Methods for making an aluminum drive shaft for automobiles or trucks or other drive shaft applications from aluminum alloy tube and methods for making drive shafts. The method includes (a) providing an 6000 series type alloy hollow elongate tube; and (b) reducing the diameter of at least one portion of the hollow elongate tube to form a reduced diameter section and transition section between the reduced diameter section and the tube; the transition section having at least three subsections: i. a first subsection having a first slope; ii. a second subsection having a second slope; and iii. a third subsection located between the first and second subsections having a third slope which is less than the first and second slopes, the third section forming a circumferential step to stiffen the transition section. The drive shafts can also be made of metals other than aluminum alloys.

18 Claims, 1 Drawing Sheet

METHOD OF FORMING A DRIVE SHAFT

RELATED APPLICATION

This application is a continuation in part of U.S Ser. No. 08/941,938, now U.S. Pat. No. 5,951,794, which is a division of U.S. Ser. No. 08/769,617, filed Dec. 18, 1996 for "Drive Shaft Having a Stepped Transition Section".

FIELD OF THE INVENTION

The invention relates to methods of forming automotive truck and other vehicular drive shafts which transmit torque from one point, such as a transmission, to another, such as a front or rear axle assembly. More particularly, the invention relates to methods of forming aluminum tubular members used in making such drive shafts and to a method for producing such.

BACKGROUND OF THE INVENTION

Drive shafts are commonly used in rear drive and four-wheel drive automobile and truck power trains and other vehicle drive trains to conduct torque and power from an engine or transmission located at one point in the vehicle to another site such as an axle assembly which can be rearward. Other applications include boating, farm or industrial power take-off shafts. Steel tubes have been used over the years and have generally proved reliable and effective. However, aluminum drive shafts offer advantages in weight and inertia savings if certain disadvantages in cost can be overcome.

One of the factors influencing the design of such a drive shaft is critical rotation speed, which is a function of the natural resonance of the shaft. If the critical speed of the drive shaft is within the rotary speed ranges encountered in normal use of the vehicle, especially under steady state conditions (e.g., cruising), such can result in noise vibration harshness (NVH) conditions. If the encounter with critical speed is transitory or brief, it may be tolerable whereas if it occurs at cruising speed, it is less tolerable. Increasing the drive shaft stiffness increases the resonance frequency and critical speed to such a high level that it is not encountered in normal cruising speeds which alleviates the NVH problem. An increase in diameter of the tube can stiffen the tube adequately but, in turn, can add weight unless the wall thickness of the tubing is made correspondingly thinner; but this, in turn, can require a higher strength material or a more costly composite.

One aluminum alloy that has been used for drive shaft applications is alloy 6061 which, according to the Aluminum Association (AA) registered limits, contains 0.8 to 1.2% Mg, 0.4 to 0.8% Si, 0.15 to 0.4% Cu, 0.04 to 0.35% Cr, the balance being aluminum and incidental elements and impurities. Some drive shafts made of 6061 are speed restrictable, and their use can involve a governor to reduce the drive shaft speed and avoid the drive shaft's critical speed. The use of longitudinal graphite fibers pultruded on the outside of a 6061 alloy drive shaft tube provides a composite drive shaft that is stiffer, such that it can spin or rotate faster, but this obviously adds to the cost of the drive shaft.

Another important aspect of a drive shaft is that it effectively transmits quite substantial amounts of torque. For instance, in a lightweight truck or a large automobile, the engine torque might be 350 pound feet at the engine crank shaft, but that can be elevated to a much higher level through a multiplying transmission (in a low gear) to a torque level of 1000 or even somewhat higher, for instance 1400 or 1500 pound feet of torque at the transmission output. Transmitting this torque obviously places a strength demand on the drive shaft in addition to the critical speed-vibration limitations. Aluminum drive shafts have been reported to make noises when the vehicle is placed into gear.

Typical drive shafts can range from about 2 or 3 inches in outer diameter (O.D.) to about 4½ or 4¾ inches or even higher, especially for trucks, for instance up to about 5 inches O.D. or even more, such as from 5½ to 7½ inches or more. Typical wall thicknesses are within about 0.05 or 0.06 inch up to about 0.08 or 0.09 or 0.1 inch or even thicker, for instance up to about 0.13 or 0.14 inch or 0.16 or 0.17 inch or more, for instance 0.25 inch. A typical drive shaft for an automobile could have an O.D. of about 3.5 inches and a wall thickness of about 0.08 inch, whereas a drive shaft for a truck could have an O.D. of about 4½ or 5 inches and a wall thickness of around 0.07 to 0.09 inch and a typical medium duty truck drive shaft can have an O.D. of 7 inches and a wall thickness of about ¼ inch.

In addition to the performance demands on the drive shaft, the material selected for a drive shaft needs to be readily capable of the fabrication steps employed in making a drive shaft, which can include welding yokes at each end for universal joints which, in turn, requires that the material selected be weldable and that it have good strength capability after welding.

An object of the present invention is to provide an aluminum alloy drive shaft that is quiet during periods of high torque.

SUMMARY OF THE INVENTION

In accordance with a preferred embodiment of the invention, disclosed is a method of forming a drive shaft having at least two cylindrical sections having different diameters and a transition section between the two cylindrical sections. The method includes (a) providing an 6000 series type alloy hollow elongate tube; and (b) reducing the diameter of at least one portion of the hollow elongate tube to form a reduced diameter section and transition section between the reduced diameter section and the tube; the transition section having at least three subsections:

i. a first subsection having a first slope;
ii. a second subsection having a second slope; and
iii. a third subsection located between the first and second subsections having a third slope which is less than the first and second slopes, the third section forming a circumferential step to stiffen the transition section.

The drive shafts can also be made of metals other than aluminum alloys.

In accordance with a preferred embodiment of the invention, an aluminum alloy containing about 0.5 to 1.3% Mg, about 0.4 to 1.2% Si, about 0.6 to 1.2% Cu, about 0.1 to 1% Mn, the balance substantially aluminum and incidental elements and impurities, is employed to make improved vehicle power transmission drive shafts at reduced cost over some other approaches, especially when considering the drive shaft designs that require high operating capability in terms of relatively high rotation speeds and relatively high torque transmission. The use of the tubing made in accordance with the invention enables producing vehicular drive shafts having the desired characteristics.

The aforesaid preferred alloy for the invention drive shafts includes AA alloy 6013 which is described in U.S. Pat. No. 4,589,932, the entire content of which is fully incorporated herein by reference. The Aluminum Association composition limits for alloy 6013 are 0.6 to 1% Si, 0.8 to 1.2% Mg, 0.6 to 1.1% Cu, 0.2 to 0.8% Mn, 0.5% max. Fe, 0.1% max. Cr, 0.25% max. Zn, 0.1% max. Ti, other elements 0.05% each, 0.15% total, the balance substantially aluminum. The entire content of the Aluminum Association "Aluminum Standards and Data", 1993, is incorporated herein by reference. All composition limits herein are by weight.

In accordance with the invention, the improved drive shaft stock is preferably made by an improved process including extruding and drawing to better facilitate consistent good strength properties including ultimate (breaking) tensile strength and yield strength, along with quite good elongation and quite good workability. This is attributed, at least in part, to achieving in the drawn tube a relatively uniform or consistent recrystallized grain structure as described herein. If care is not exercised in producing the desired extruded and cold finished tube, large or relatively widely varying grain sizes can occur when the metal recrystallizes during heating such as during an anneal or a solution heat treatment. Such grains of large or relatively widely varying size can detract from strength properties by either lowering them or making them inconsistent from extrusion to extrusion or even along the length of a given extrusion, or combinations of these effects. It can be desired to have the tube unrecrystallized such that most, for instance 70% or more, or substantially all of the tube metal is unrecrystallized. However, in making cold drawn, or cold finished, tube, achieving a sufficiently unrecrystallized grain structure can be difficult in view of the substantial amounts of cold work used in producing the relatively thin-walled tubes. When subsequently annealed or solution heat treated, the cold worked tube can recrystallize, but that can lead to small grains along with large grains. This mixed grain structure impairs consistent strength and corrosion resistance. If the extrusion stock (billets or castings used for extruding into extrusions) is relatively small, such as 6 to 8 or 9 inches diameter, or the resulting extrusion is quite thin, such as ⅛ or ¼ inch (or both), such can favor achieving finer relatively more uniform grain size than using larger commercial scale practices, such as ingot or extrusion stock over 11 or 12 inches, such as 13, 14 or 15-inches to 18, 20 or 22-inches or larger diameter stock, and making extruded sections thicker than ¼ or ½ inch (for instance, above 1 inch thick) where, it has been found, the extrusion operation can lead to excessively large recrystallized grains later in the overall manufacturing process. Nonetheless, the invention is useful with billet sizes from 6 inches (or less) up to and over 14 or 15 inches in diameter.

In accordance with the invention, it has been found that controlling the extrusion temperature as hereinbelow set forth can overcome the problem of excessive grain size or variation after solution heat treating or other elevated temperature exposures such as annealing. That is, extrusion temperatures of 850° or 1000° F., especially temperatures over about 900° F., (as referred to in U.S. Pat. No. 4,589,932) can be detrimental in making certain cold finished tube, whereas extruding at temperatures of 400° to 600° F. or 700° F. can be quite beneficial in producing certain products of more uniform or relatively fine recrystallized grain size, or both.

In accordance with the invention, the improved tubing is preferably made by extruding under controlled conditions which is followed by drawing the extruded tube at substantially room temperature to cold work it and reduce its metal cross-sectional area which, in turn, is followed by solution heat treating, quenching and stretching. The cold reductions by drawing can be in the area of 20 to 25% reduction per pass for overall reductions of about 20 or 30% up to about 60 or even 80% in typical productions.

The invention also includes making a 6000 series aluminum alloy drive shaft from a drawn tube whose ends are reduced in diameter by a two-step push pointing or rotary swaging, preferably a relatively short time after solution treating and quenching.

BRIEF DESCRIPTION OF THE DRAWINGS

Other features of the present invention will be further described in the following related description of the preferred embodiment which is to be considered together with the accompanying drawings wherein like figures refer to like parts and further wherein.

DETAILED DESCRIPTION OF THE PREFERRED EMBODIMENTS

Figure 2:
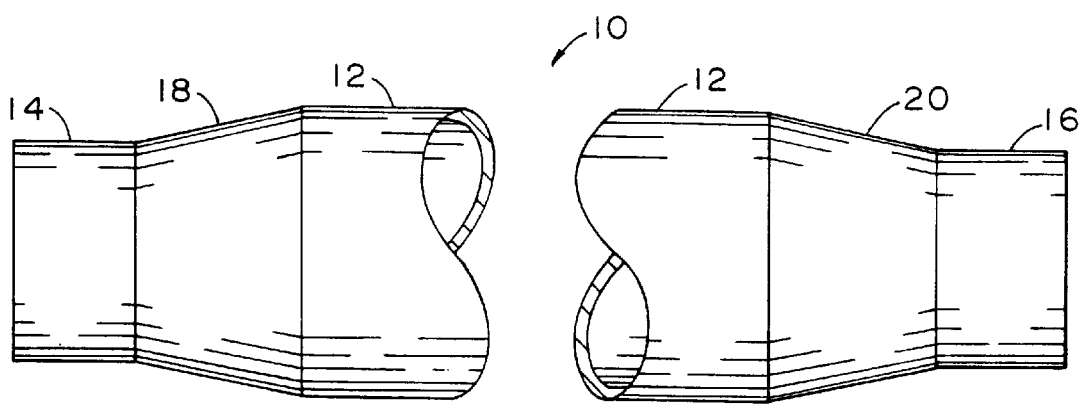
FIG. 2 is a side view of a prior art drive shaft.

Turning first to FIG. 2, there is illustrated a side view of drive shaft 10 of the prior art. Drive shaft 10 is generally cylindrical and has a central cylindrical section 12 and two reduced sections 14 and 16 located on either side of central section 12. Transitional sections 18 and 20 connect the two reduced sections 14 and 16 with central section 12. Transition sections 18 and 20 have a generally conical shape so that the slope of transition sections 18 and 20 are constant and form a straight line. The taper on transition sections 18 and 20 is about 8° to 16° relative to the long axis of the drive shaft and preferably about 10° to 14°.

The basic design of drive shaft 10 has been successfully fabricated from steel tubes. It is desirable to fabricate the exact same drive shaft from aluminum tube to obtain advantages in weight and inertia. However, the substitution of aluminum tube for the steel tube results in unexpected noise coming from the transmission.

Although not wishing to be bound by any theory, it is believed that there is a temporary distortion of transition sections 18 and 20 under heavy torque and vibration conditions. The distortion, also known as "oil canning", causes transition sections 18 and 20 to buckle and make a noise which is audible to the driver and passengers of the vehicle. The noise is undesirable.

Figure 1:
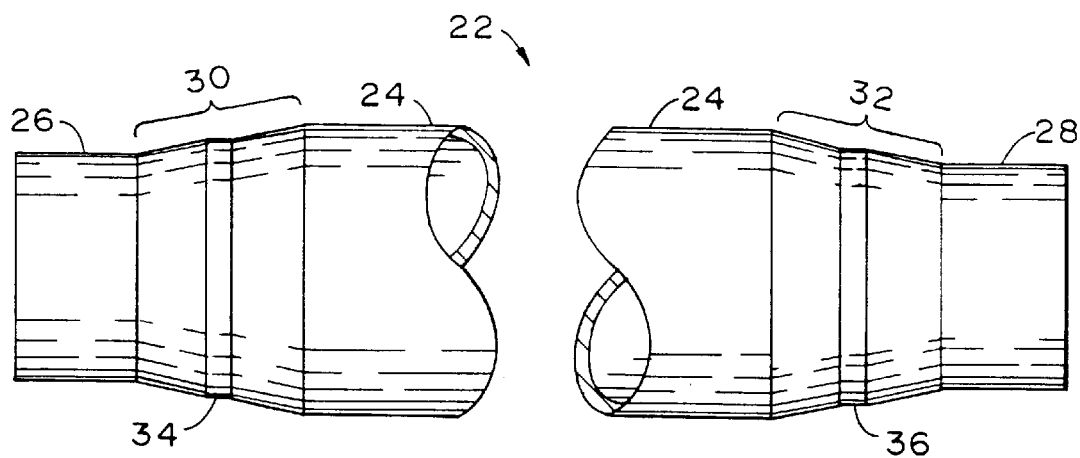
FIG. 1 is a side view of the drive shaft of the present invention.

Turning next to FIG. 1, there is illustrated drive shaft 22 of the present invention which has a structure for the elimination of the oil-canning phenomenon. Drive shaft 22 is generally cylindrical and has a central cylindrical section 24 and two reduced sections 26 and 28 each on either side of central section 24. Transitional sections 30 and 32 connect the two reduced sections 26 and 28 with central section 24.

Transition sections 30 and 32 have a generally conical shape. The taper on transition sections 30 and 32 is about 8° to 16° and preferably about 10° to 14°. The key feature of the present invention is that the taper of transition sections 30 and 32 is non-linear. Near the center of each of transition sections 30 and 32 is a circumferential "step" 34 and 36 which stiffens transition sections 30 and 32, respectively. Step 34 has a taper of about 0° to 5° relative to the long axis of the drive shaft.

Surprisingly, drive shaft 22 eliminates the noise usually associated with the use of aluminum alloys. Although not wishing to be bound by any theory, it is believed that step 34 stiffens transition sections 30 and 32 so that there is no distortion or movement of drive shaft 22 during periods of high torque. The lack of movement from distortion in transition sections 30 and 32 eliminates the oil canning noise which is audible to the driver and passengers of the vehicle.

In accordance with a preferred process, the alloy composition is formulated to contain about 0.5 to 1.3% Mg, preferably about 0.7 or 0.8 to 1.1 or 1.2% Mg, and about 0.4 to 1.2%, preferably about 0.6 to 0.9 or 1% Si, and about 0.6 to 1.2%, preferably about 0.7 to 1%, Cu, and about 0.1 to 1%, preferably about 0.2 or 0.3 to 0.7 or 0.8%, Mn, with Fe preferably around 0.5% or less, for instance 0.35 or 0.4% or less, the balance substantially aluminum and incidental elements and impurities. The alloy is typically solidified into ingot derived from working stock by continuous casting or semi-continuous casting into a shape suitable for extrusion which is typically a round ingot billet. The ingot can be machined or scalped to remove surface imperfections, if desired, or it can be extruded without machining if the surface is suitable for such. The extrusion process produces a substantially reduced diameter but greatly increased length compared to the extrusion billet. Before extrusion, the metal is typically preheated or homogenized preferably by heating to a temperature above 950° F., for instance within 1000° to 1050° or 1060° F. or more, preferably within about 1030° or 1040° to about 1050° or 1060° or 1070° F. or possibly 1080° F. or higher (although melting related damage which can occur at 1075° F. should be avoided), for over 1 hour, more preferably about 4 hours or more, for instance 6 or 8 hours or more, such as 24 hours or more, preferably in a protective atmosphere.

After preheat or homogenizing, the stock is extruded to produce a hollow tube, it generally being recognized in the extrusion art that dies and other provisions can be made for extruding hollow shapes. The die-over-mandrel technique using a pre-drilled hollow extrusion stock or billet and the piercing process which pierces a solid extrusion stock or billet in the extrusion press are two known techniques suitable for making seamless hollow extrusions. Extrusion can be direct or indirect. It is an important preference in practicing the invention that extrusion be conducted at temperatures at or above 400° F., typically within about 500° or 600° up to about 700° F., preferably within about 500° or 550° or 600° to about 650° or possibly 675° F., for instance within temperatures of about 600° or 620° to about 650° F. Temperatures up to 750° or possibly 800° F. or even higher, such as temperatures of 850° or 875° or even possibly up to 890°, can be useful in this embodiment but on a less preferred basis. Extrusion rates of at least 75 feet per minute are preferred, especially if the extrusion temperature is relatively high, for instance 750° F. or more, especially temperatures of 800° F. or more. The extrusion ratio (billet cross section metal area divided by extrusion cross section metal area) is desirably at least 5 to 1, typically about 5 to about 30 or more to 1, for instance about 8 or 10 to 25 or 27 to 1. Extrusion temperatures can be controlled by heating the extrusion stock, and preferably also the extrusion chamber, to the desired temperature. In accordance with the invention, it has been found that using extrusion temperatures and extrusion ratio as just described can overcome a tendency to encounter excessively varying or large grain size when the material recrystallizes during subsequent heating such as solution heat treating. Extrusions made by indirect extrusion often can have larger grains in the immediate outer surface or "skin" region. In referring to grain size herein, such is intended to refer to the regions inside the skin regions in extrusions or products made from such. Typical examples of extruded stock suited for making drive shafts herein can include outer diameters from about 3 to 8 inches or possibly more and wall thicknesses from about 0.06 or 0.07 inch, typically 0.08 or 0.09 inch to around 0.12 or 0.14 inch or higher, up to 0.2 inch or more, even up to about 0.4 inch or possibly more, for instance ½ inch for large diameter extruded stock.

The extrusion typically has ends cropped off and can be cut to desired lengths for subsequent operations. The extrusion may be annealed for around 1 or 2 hours at a temperature within about 600° to about 700° F., for instance about 650° F., furnace cooled to about 450° F. after which the tube can be removed from the furnace. Annealing at this point can be performed but is not necessary. The annealing conditions the metal for subsequent drawing operations and can be advantageous especially where the drawing operations produce substantial reductions in thickness.

The tubing is next subjected to cold drawing wherein it is pulled through a die which reduces the O.D. and the wall thickness. Normally there is a mandrel inside the tube during this drawing operation. This drawing significantly reduces the O.D. and wall thickness and makes the tube significantly longer while slightly reducing the tube inner diameter (I.D.). Each drawing operation or stage typically involves a single die and a reduction in metal cross-sectional area of about 2% to 50% or more, preferably about 15% or 20% to about 22%, 23% or 25% or even higher reductions up to 30% or 40%. Two or three such reductions or stages can be taken, one after the other, to accumulate a substantial reduction, for instance 25% to 80% or more, but if total overall reductions exceeding 50% are desired, it can sometimes be advantageous to impose an intermediate anneal somewhere in the drawing schedule. For instance, two or three or possibly four drawing reductions can be made followed by an intermediate anneal followed, in turn, by 2, 3 or 4 more drawing reduction passes. However, reductions in the neighborhood of 75% can be done without annealing.

In some cases, it may be desired to make a tube with wall thickness that is thicker at the ends. This can enhance welding universal joint yokes at the ends of the tube or other types of fastening at the ends or possibly elsewhere where locally thicker metal, for instance at the end of a shaft, facilitates better fastening. In the case of welding, the strength in the heat-affected zone can be lowered and this effect compensated for by the locally thicker tube wall. U.S. Pat. No. 4,527,978 shows an example of an automotive drive shaft that has thicker end walls. This variation in wall thickness can be accompanied by either an increase in O.D. or a decrease in I.D., or possibly both, and can be accomplished by machining, but it is preferred to accomplish it during drawing by positioning a step in a mandrel or the butt end of a mandrel closer to a tapered drawing die inlet (thinner tube wall) or slightly further away for a thicker drawn tube wall thickness, in which case the O.D. remains essentially the same but the I.D. is lessened at the tube end region to increase tube wall thickness. The drawing of stepped or varying thickness tube walls is known in the art and, if done, preferably should be done before solution heat treating. One preferred way is shown in U.S. Pat. No. 4,788,841, the entire disclosure and content of which is hereby incorporated by reference. In the case of a variable wall thickness, the drawing thickness reduction percentages just discussed typically refer to the thinner part of the drawn tube, although in some cases they can refer to the thicker wall. Other disclosures illustrating techniques for producing variable thickness wall tubing are U.S. Pat. Nos. 2,228,301; 2,258,242 and 2,679,925. All of the aforesaid U.S. Pat. Nos. 2,228,301; 2,258,242; 2,679,925; 4,527,978 and 4,788,841, are fully incorporated herein by reference.

Heating the tube, either during an intermediate anneal, if one is used, or during solution heat treatment typically can cause recrystallization to occur. The practice of the invention favors forming a relatively fine and relatively uniform recrystallized grain size when this recrystallization occurs. Typical transverse recrystallized grain sizes preferably can range from ASTM-2 or -3 to ASTM-7 or -8 (higher numbers are finer grains) referring to ASTM E112, the entire content of which is hereby incorporated by reference. Tube of the herein referred to alloy made identically to the invention process except for extrusion temperatures around 850° or 900° F. can have quite large transverse grain sizes such as ASTM-0 and can have relatively widely varying grain sizes.

The tube is solution heat treated, preferably in a protective atmosphere, by heating to temperatures typically at 1000° F. or higher, preferably at temperatures of 1025° or 1030° F. or higher, for instance temperatures of 1035° to 1050° F. or higher, up to temperatures of about 1065 or 1070°, or possibly 1080° F. or more, but not so high as to excessively damage the tube such as by approaching too close to melting or incipient melting which can occur as low as 1075° F. On a less preferred basis, solution heat treating can be at temperatures as low as 980° F. minimum or possibly 975° F. However, as just stated, higher temperatures are preferred.

The solution heated tubing is then quenched, preferably by immersion in cold water, although cold water sprays or, in some cases, possibly even a drastic air quench could be used, it being preferable in some cases to assure a rapid quench. In some cases, it can be advantageous to slightly retard quench to reduce residual stress, as discussed hereinbelow. The quenched tube can then be stretched about ½ to 1½% to straighten it or, if desired, it can be further drawn by pulling through a die as described earlier. Solution heat treating and quenching, with or without a relatively small amount of cold work in straightening (that may not be recognized in setting mechanical property limits), produces a T-4 type temper condition.

The T-4-type condition can be cut or segmented to suitable lengths and the wall thickness at the end regions made thicker as described earlier. This temper is quite workable which eases the process although not as workable as the W temper as discussed below. Alternatively, the end region wall thickness can be increased before solution heat treatment.

The solution heat treated tube, with or without subsequent stretching or cold drawing, or wall thickening at the end regions, is artificially aged to develop its strength properties. This typically includes heating above 250° or 270° F., typically above 300° F., for instance within about 330° to about 400° or 430° F. or a little more, preferably within about 360° to about 390° F. or possibly 400° F. for a period of time within around an hour or a little less or 2 hours to about 10 or 15 hours, typically about 3 or 4 to 5 or 6 hours for temperatures about 350° to 390° F., which generally varies inversely with temperature (higher temperature for shorter time or lower temperature for longer time) and this develops artificially aged or T-6 or T-8 strength, depending on whether or not and to what extent cold work is utilized after solution heat treating and before artificial aging. If the amount of cold work performed on the solution heat treated and quenched tube is around 1% or so, for instance, if the tube is only straightened and then artificially aged, the tube can be in a T-6 type condition, whereas if a higher amount of cold work is used between solution heat treating and aging, for instance, drawing reductions around 4% or 5% or so to about 30% or so, the resulting tubing can be in a T-8 type temper such as T-81. These drawing operations (after solution heat treating) offer certain advantages in facilitating very good dimensional control. In addition, there can be a significant increase in strength such as an increase of 5% or 10% and possibly more.

Referring to the invention products, the invention tubing in T-6 temper can have a relatively high strength roughly the same as aerospace alloy 2024 in T-3 temper (2024-T-3 tube can have a yield strength around 42 ksi and a tensile strength over 60 ksi) but not have 2024's inferior stress corrosion cracking resistance, the invention product being quite resistant to stress corrosion cracking effects which can be a serious consideration in vehicle drive shafts since an unexpected stress corrosion crack breakage during hard use would be undesirable product performance. The invention tubing also has good fracture toughness and good fatigue properties in a drive shaft assembly.

In manufacturing improved vehicular power transmission drive shafts in accordance with the invention, the invention tubes are welded or otherwise joined to end caps or end members which typically are employed to connect to or form a part of universal joints (U-joint) or possibly to other attachments or fixtures at one or both ends of a drive shaft. Often the drive shaft is welded to a U-joint yoke. The welding can be by tungsten inert gas (TIG), metal inert gas (MIG) welding or any other kind of welding suitable for the purpose, an important benefit achieved in the practice of the invention being that good welds are relatively easy to achieve and the strength of the welded assembly is quite good in comparison with other materials employed in making drive shafts. As explained earlier, the tubes can have their end regions made thicker, for instance, for adapting to welding or other connection means. Welding alloys containing over 3% Si, for instance welding alloy containing about 3.5 to 6% Si with or without about 0.05 or 0.1 to 0.3 or 0.4% Mg, can be used as the weld filler alloy. Alloy 4043 contains about 4.5 to 6% Si (max. Mg is 0.05%) and alloy 4643 contains about 3.6 to 4.6% Si and about 0.1 to 0.3% Mg and both are examples of known filler alloys suitable for welding the invention drive shafts. It can be preferred to use weld filler alloy containing over 0.05% Mg, more preferably 0.1% Mg or more, to reduce any tendency for the weld filler metal to draw Mg from the aluminum tube members.

Another aspect of the invention includes production of a drive shaft tube having a relatively larger diameter for the central region and dominant region of its length and a smaller diameter tube portion at one or both ends. This provides the benefit of a larger major (central) length diameter for increased critical speed and smaller end diameter for fitting and connecting to other members. The smaller diameter end reduction is imparted by swaging, for instance rotary swaging, or preferably by push-pointing, which tapers down the O.D. to a smaller diameter at one or both ends. Push pointing is preferred because it induces less residual stress in the reduced diameter region than swaging which, in more severe reductions, can cause cracks. Push pointing, because of less harsh metal working for a given reduction, is thus preferred from the standpoint of less residual stress and less tendency to crack or induce cracks. In addition, push pointing results in much better reduced I.D. inside surface, particularly where an inside mandrel is not used. The swaged or push-pointed smaller diameter (end) portion typically has a thicker wall than the larger diameter (central) portion, and the taper transition between the larger and smaller diameters gradually thickens in wall thickness going from the larger, thinner wall diameter to the smaller, thicker wall diameter. Rotary swaging is a known technique wherein opposing dies are rapidly hammered against the O.D. of a tube to swage down the diameter to a smaller diameter. Push pointing is a known technique wherein a tube or pipe of given diameter is pushed through a tapered reducing die to neck down or reduce the initial tube diameter.

In practicing the invention with either swaging or push pointing, it can be preferred that the operation be carried out over a mandrel such that the reduced internal diameter is formed against a mandrel which can enhance surface of the reduced internal diameter and thus improve frictional fit with the mating surface of the yoke or other end member and possibly can leave some of the metal in compressive reduced residual stress which can be an advantage. The mandrel is preferably fixed laterally relative to the push point dies and tube gripper means rather than being free to float or move laterally so as to more precisely control dimensions and concentricity and metal working and movement. The mandrel can have a raised ring or band on its front end region (the end projecting into the tube) such that when the mandrel is withdrawn said raised ring bearing surface works the inside surface of the reduced diameter tube end which can provide quite good reduced end I.D. dimensional control and good surface which is important for friction fitting with the drive shaft U-joint yoke. This effect can be combined with moving the O.D. bearing surface of the push point die or dies along the reduced O.D. such that something of an ironing effect occurs as the inside mandrel and O.D. dies are moved together along the reduced O.D. in withdrawing the tube from the push point tooling.

A typical illustrative example of a tube that is end reduced by swaging or push pointing could start with a tube about 6 feet long having an O.D. of about 5 inches and a wall thickness of about 0.08 inch. The last 4 to 6 inches on each end are reduced down to an O.D. of about 4 inches with a wall thickness which may be around 0.09 or 0.095 inch. A taper of about 8° to 16° or preferably about 10° to 14° and about 1½ to 2 inches long serves as a transition between the four-inch O.D. end region and the 5 inch O.D. central region which is roughly in the neighborhood of 5 or so feet in length. Thus, the tube after swaging or push pointing has a central region roughly ranging from about 4½ feet to about 5 or so feet long that is about 5 inches in O.D. and, at each end, a 2 or so inch transition or taper down to a 4 inch diameter followed by a 4 to 6 inch length that is 4 inches in diameter. The wall thickness in the transition region varies from the thinner central region (about 0.08 inch thick) to the thicker end region (about 0.09 or 0.095 inch thick). If a mandrel is used, the wall thickness at the reduced end can be further controlled so as to be the same as the unreduced central region of the tube length or even thinner. In the illustrative example of the 6-foot long, 5-inch O.D. tube, using a mandrel, the end region wall thickness can be any desired thickness less than the 0.09 or 0.095 inch thickness achieved without the mandrel. The thickness at the reduced shaft end thus could be 0.085 or even 0.075 inch or any practical thickness less than the 0.09 or 0.095 inch wall achieved without a mandrel.

Another aspect affecting wall thickness at an end region of the drive shaft is to thicken a tube end as described earlier, for instance as described in U.S. Pat. No. 4,527,798, and then push point the tube to reduce the diameter of that same tube end region. These operations can combine to make the reduced diameter tube end wall fairly thick compared to the starting tube wall thickness.

The swaging or push-pointing tube end reduction is preferably done after solution heat treatment and quenching such that the drive shaft can be artificially aged after swaging. After solution heat treating, the tube is drastically quenched in cold water or it can be subjected to a controlled quench to reduce distortion of the tube such as by using means to slightly retard the rate of cooling, such as by quenching in warm water, for instance water at a temperature within around 120° to 180° F., or by using chemical quench rate additives such as polyalkylene glycol in an amount of 10% or 15% to about 30% or 40% in water at roughly room or slightly elevated temperature, such as 90° to 110° F. Another quench approach is to use water containing carbon dioxide, for example carbonated water. These procedures can lower residual stresses and thus reduce the amount of distortion to be corrected later. The strength loss, if any, that may result from the use of a retarded quench can be reduced or minimized by carefully controlling the quench conditions so as to quench at a slightly reduced rate but not a grossly reduced quench rate.

After quenching either rapidly or in a controlled, slightly retarded quench, the tubing is stretched if desired or roll straightened as needed, or both, to adequately straighten it and control roundness, and it is then cut to length, that is, provided as a length substantially suitable for making into a drive shaft, herein sometimes referred to as a drive shaft suitable length. At this point, the swaging, or push pointing operation is applied to one or both end regions of the tube so as to make the desired configuration of a larger diameter, thinner walled tube in the central region of the drive shaft tube with one or both ends featuring a smaller O.D., thicker walled region with a transition region between the larger and smaller diameters wherein the wall thickness tapers from the thicker, smaller diameter condition to the larger diameter, thinner wall condition. The swaging or push pointing is carried out at room temperature and the workability of the material after solution heat treating and quenching is such as to permit the operation. It is preferable to perform the end diameter reduction (preferably by swaging or push pointing) shortly after quenching when the metal has a lower yield strength rather than days later in a naturally aged stable T-4 higher strength condition because the fatigue strength (for a given number of cycles) and performance (for instance, the number of cycles at particular cyclic loading) of the product after artificial aging can suffer if too much time or natural room temperature aging is allowed to occur before end reduction even though end reduction precedes artificial aging. Accordingly, it is preferred to perform the tube end reduction within not more than 24 to 30 hours after solution heat treatment and quenching, preferably within 10 to 15 or 20 hours at room temperature, more preferably within not more than 3 to 5 hours, although on a less preferred basis at a time of around up to 40 or 48 hours, or in some cases 60 hours or more on a much less preferred basis. Refrigeration can retard natural aging and prolong the time between solution heat treating and tube end reduction. Accordingly, yield strength can be used as an indicator as to how far natural aging has proceeded. For instance, for alloy 6013 discussed hereinabove, the yield strength 15 minutes after quench can typically be around 11 or 12 ksi but increases to around 19 or 20 ksi or so after about 10 hours and about 22 ksi or so after about 24 hours. For alloy 6061, the yield strength 15 minutes after quench can typically be around 9 ksi or so and increase to around 13 or 14 ksi or so about 10 hours after quench and around 15 or 16 ksi or so after about 24 hours. Refrigeration after quench can very substantially lengthen the time it takes to reach a given degree of natural aging or associated strength level. For instance, cooling below 0° F. can greatly extend these times. Hence, when speaking herein of performing tube end reduction substantially within a time such as 10 hours or its substantial equivalent, such is intended to refer to within around 10 hours at about room temperature (around 70° to 90° F.) or within a longer time at reduced or refrigerated temperature so long as the degree of natural aging or associated strength level does not exceed a level commensurate with room temperature aging up to 10 hours. The temper designation sometimes used for solution heat treated and quenched material is W temper, referring to the unstable condition between quenching and natural aging to a substantially stable strength level (T-4 temper). A designation "W ½ hour" refers to ½ hour after quench and the strength level associated with ½ hour natural aging after quench, and, further, as used herein, refers to that same strength level, albeit at a longer time after quench than ½ hour in the case of refrigeration or reduced temperature which retards the natural aging strength effect for a given time period.

After push pointing or swaging, the drive shaft can be chamfered, if desired, and then artificially aged as discussed earlier. The aforesaid swaged or push pointing end region drive shaft is preferably carried out on the preferred alloy as described earlier, but also can be carried out on other alloys, such as other 6000 series type alloys, (that is, aluminum alloys containing Mg and Si as the major alloy additions typically along with one or more of Cu, Mn or Cr, typically in lesser amounts than Mg and Si), for instance alloy 6061, containing 0.4 to 0.8% Si, 0.8 to 1.2% Mg, 0.15 to 0.4% Cu, 0.04 to 0.35% Cr. The 6000 series alloy can be provided with or without continuous or discontinuous reinforcing media such as aluminum oxide particles (discontinuous), preferably about 9 to 13 microns in size or diameter present in about 15 to 25 percent volume fraction, typically around 20%. In the case of such a 6000 type alloy metal matrix composite, the cold drawing reductions can be usually less, for instance around 2% or 5% or more, than is preferred for a monolithic alloy such as unreinforced 6061 alloy. However, the use of the alloy described earlier is preferred for some applications. The drive shaft end members can be welded or attached after artificial aging.

Up to this point, the process of making an improved drive shaft has been described in terms of preferred practices wherein a tube is extruded, preferably under controlled temperature conditions and preferably then annealed and then drawn to substantial reductions through drawing dies, and then solution heat treated and quenched. However, in a broader sense the invention includes, albeit on a less preferred basis, using a press quench rather than separate solution heat treating later. According to this less preferred sequence, the material is heated to a solution heat treating temperature and then is hot extruded into a tube which is quenched as it exits the extrusion operation and is then preferably cold drawn to some reduction of, for instance, 2 or 5% or more, preferably 8 or 10% or more, and is then cut to length and subjected to push pointing or swaging to provide a drive shaft tube with one or both end regions of the tube imparted with a smaller diameter than the central regions of the tube but with the end region or regions with the smaller O.D. typically having a thicker walled tube. The extrusion temperature can be higher than needed for extrusion itself, but high extrusion temperatures can favor solutionizing effect. While some cold drawing at some time after extrusion is preferred, such can be omitted, albeit on a less preferred basis, provided suitable dimensional control can be achieved in extruding. Indirect extrusion may be helpful in achieving dimensional control. As indicated, this sequence is less preferred than the sequence earlier described because of potentially lowering fatigue strength especially in the region of the welds used to join the drive shaft tube to the end members, for instance universal joint (U-joint) yokes. Nonetheless, this sequence can be useful especially if the operations are carried out rapidly such that the substantial metal working aspects of drawing and push pointing or swaging are carried out within 40 or 48 hours after the press quenching, preferably within 24 or 30 hours, and more preferably within 10 or 15 or 20 hours after quenching, and further, preferably if the push pointing operation uses a mandrel on the inside of the tube sized for the push point reduced I.D. at the tube end region. That is, the drawing operation and diameter reduction at the end region or regions are preferably all concluded within the time span after press quenching just indicated. Another practice, albeit less preferred, is to push point reduce the drive shaft end region or regions after artificial aging, especially if artificial aging is carried to a strength level less than that sometimes referred to as peak strength (T-6), for instance, if the metal is overaged (artificially aged past "peak strength" which lowers the strength below "peak strength"), although for less severe push point reductions, such as reductions less than 15 or possibly 20% of the O.D. (for instance, a 10% or less O.D. reduction), it can be feasible to push point reduce T-6 tube. However, where the reduction in O.D. is over 15 or 20%, push pointing after artificial aging can have disadvantages and, while possible, is not preferred.

The improved drive shafts, especially following the herein preferred practices, will have good strength and good corrosion resistance even in the heat affected zone adjacent weldments. The use of the invention tubing in making the drive shaft can avoid or reduce the need to resort to graphite fibers on the outside to attain the necessary performance without the complexities and cost of adding the fibers to make a composite.

It is also to be appreciated that although the invention has been described in terms of aluminum alloys, the method and apparatus of the present invention may also be employed with other metals, metal matrix composites, metal laminates and cermets. Other metals that can be used are ferrous alloys, Mg alloys and other engineering alloys used in the automotive and vehicular industries. The present invention can be used with steel drive shafts so that the wall thickness of the steel tube can be reduced to dimensions that would have caused oil-canning in steel. Reductions in wall thickness contributes to the overall reduction in the weight of the vehicle.

Although the usefulness of the present invention has been described to some extent in terms of a single central circumferential step, it is contemplated that multiple steps are also useful in the present invention. In addition, it is not necessary that the step be formed in a central location in the transition section or the multiple steps be equally spaced along the length of the transition sections.

It is also to be appreciated that although the invention has been described in terms of a seamless extruded tube, it is not necessary that the tube be formed by extruded metal. The tube may formed from an elongated sheet product which rolled in a circular configuration and then welded into tube. Such tubes are known in the art as 'seamed tube' since they have a welded seam which runs their length. The tube thus formed is then swaged to form the stepped drive shaft.

What is believed to be the best mode of the invention has been described above. However, it will be apparent to those skilled in the art that numerous variations of the type described could be made to the present invention without departing from the spirit of the invention. The scope of the present invention is defined by the broad general meaning of the terms in which the claims are expressed.

What is claimed is:

1. In a method of producing an aluminum tube member for a vehicular drive shaft having a transition section with a length and wall thickness sufficient to cause noises during periods of high stress, the improvement wherein said aluminum tube member is made by a method comprising:

(a) providing an 6000 series type alloy hollow elongate tube; and (b) reducing the diameter of at least one portion of said hollow elongate tube to form a reduced diameter section and transition section between said reduced diameter section and said tube; said transition section having at least three subsections:
  i. a first subsection having a first slope;
  ii. a second subsection having a second slope; and
  iii. a third subsection located between said first and second subsections having a third slope which is less than said first and second slopes, said third section forming a circumferential step to stiffen said transition section.

2. The method of claim 1 in which (a) is Aluminum association alloy 6013.

3. The method of claim 1 in which (b) is performed to form a transition section having a non-linear transition slope.

4. The method of claim 1 in which (b) is performed to form a transition section having slope of between about 8° and 16°.

5. The method of claim 1 in which (b) is performed to form a transition section having slope of between about 10° and 14°.

6. The method of claim 1 in which (b) is performed to form a transition section having central circumferential stiffener.

7. The method of claim 1 in which (b) is performed to form a transition section having central circumferential stiffener section having a slope of from 0° to 5°.

8. The method of claim 1 wherein said reducing the diameter at one or both ends is done by operations comprising push pointing.

9. The method of claim 1 wherein said reducing the diameter at one or both ends is done by swaging.

10. The method of claim 1 wherein said aluminum tubular member has a wall thickness at least one end region that is thicker than the wall thickness at some other regions.

11. The drive shaft of claim 1 in which said transition section has a middle wall between opposing end walls, said middle wall being non-parallel to said end walls.

12. In a method of producing a vehicular drive shaft from an alloy body is formed into a hollow elongate tube having a transition section with a length and wall thickness sufficient to cause noises during periods of high stress, the improvement comprising:

reducing the diameter of at least one portion of said hollow elongate tube to form a reduced diameter section and transition section between said reduced diameter section and said tube; said transition section at least three subsections:
  a first subsection having a first slope;
  a second subsection having a second slope; and
  a third subsection located between said first and second subsections having a third slope which is less than said first and second slopes, said third section forming a circumferential step to stiffen said transition section.

13. The method of claim 12 wherein said alloy is selected from the group consisting of ferrous alloys, aluminum alloys and Mg alloys.

14. The method of claim 12 wherein said alloy is a 6000 series aluminum alloys.

15. The method of claim 12 wherein said alloy is selected from the group consisting of 6013, 6021 and 6061 aluminum alloys.

16. The method of claim 12 in which said transition section has a middle wall between opposing end walls, said middle wall being non-parallel to said end walls.

17. The method of claim 12 in which said hollow elongate tube is a formed via extrusion.

18. The method of claim 12 in which said hollow elongate tube is a formed from an elongated sheet product which rolled in a circular configuration and then welded into tube.

* * * * *